(12) United States Patent
Liu

(10) Patent No.: US 10,767,562 B2
(45) Date of Patent: Sep. 8, 2020

(54) MODULATED COOLED P3 AIR FOR IMPELLER

(71) Applicant: PRATT & WHITNEY CANADA CORP., Longueuil (CA)

(72) Inventor: Xiaoliu Liu, Mississauga (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 369 days.

(21) Appl. No.: 14/565,524

(22) Filed: Dec. 10, 2014

(65) Prior Publication Data

US 2016/0169109 A1 Jun. 16, 2016

(51) Int. Cl.
| | | |
|---|---|---|
| F02C 7/00 | (2006.01) | |
| F02C 7/18 | (2006.01) | |
| F01D 5/08 | (2006.01) | |
| F02C 7/143 | (2006.01) | |
| F02C 9/18 | (2006.01) | |
| F04D 29/52 | (2006.01) | |
| F04D 29/58 | (2006.01) | |

(52) U.S. Cl.
CPC .............. *F02C 7/185* (2013.01); *F01D 5/082* (2013.01); *F02C 7/143* (2013.01); *F02C 9/18* (2013.01); *F04D 29/522* (2013.01); *F04D 29/584* (2013.01); *F05D 2260/213* (2013.01)

(58) Field of Classification Search
CPC .......... F01D 5/082; F01D 5/085; F01D 5/081; F02C 6/08; F02C 7/18; F02C 7/12; F02C 7/16; F02C 7/185; F02C 9/18; F02C 3/08; F02C 3/05
See application file for complete search history.

(56) References Cited

U.S. PATENT DOCUMENTS

| | | | |
|---|---|---|---|
| 4,462,204 A | 7/1984 | Hull | |
| 5,414,992 A * | 5/1995 | Glickstein | ............ B64D 13/006 60/39.83 |
| 5,645,397 A * | 7/1997 | Soechting | ............... F01D 5/187 415/115 |

(Continued)

FOREIGN PATENT DOCUMENTS

| | | |
|---|---|---|
| EP | 2374995 | 10/2011 |
| EP | 1881182 B1 | 4/2018 |

OTHER PUBLICATIONS

Hui, Ma, Troubleshooting: Taking a look at the PT6A-27 Engine, Mar. 1, 2002, http://www.aviationpros.com/article/10387616/troubleshooting-taking-a-look-at-the-pt6a-27-engine.*

(Continued)

*Primary Examiner* — Todd E Manahan
*Assistant Examiner* — Edwin Kang
(74) *Attorney, Agent, or Firm* — Norton Rose Fulbright Canada LLP

(57) ABSTRACT

A method and apparatus using a cooler to selectively cool P3 air directed into an impeller rear cavity of a gas turbine engine during engine high power levels, may include connection of the cooler to a low pressure compressor bleed-off valve apparatus that is modulated to be closed during engine high power levels to create a pressure differential over the bleed-off valve apparatus, to drive a stream of low pressure compressor air as a cooling work fluid under such pressure differential to selectively flow through the cooler.

10 Claims, 1 Drawing Sheet

(56) References Cited

U.S. PATENT DOCUMENTS

| | | | |
|---|---|---|---|
| 6,035,627 A * | 3/2000 | Liu | F02C 7/185 415/176 |
| 6,276,896 B1 | 8/2001 | Burge et al. | |
| 7,594,403 B2 | 9/2009 | Cadieux | |
| 8,256,229 B2 * | 9/2012 | Glahn | F01D 5/081 60/39.83 |
| 8,459,040 B2 * | 6/2013 | Glahn | F01D 5/081 60/39.23 |
| 8,677,761 B2 * | 3/2014 | Leach | F02C 9/18 60/39.091 |
| 8,967,528 B2 * | 3/2015 | Mackin | F02C 6/08 244/134 R |
| 2008/0019829 A1 | 1/2008 | Argaud et al. | |
| 2010/0215480 A1 * | 8/2010 | Leach | F02C 9/18 415/145 |
| 2012/0117977 A1 * | 5/2012 | Childers | F02C 6/08 60/782 |
| 2012/0282079 A1 * | 11/2012 | Glahn | F01D 5/081 415/1 |
| 2013/0187007 A1 * | 7/2013 | Mackin | F02C 6/08 244/134 R |
| 2013/0192240 A1 | 8/2013 | Munsell et al. | |
| 2014/0311157 A1 * | 10/2014 | Laurello | F02C 6/08 60/782 |
| 2015/0089955 A1 * | 4/2015 | Knapp | F02C 6/08 60/782 |

OTHER PUBLICATIONS

Zalud, Todd, Gears Put A New Spin On Turbofan Performance, Nov. 5, 1998, Machine Design.*

* cited by examiner

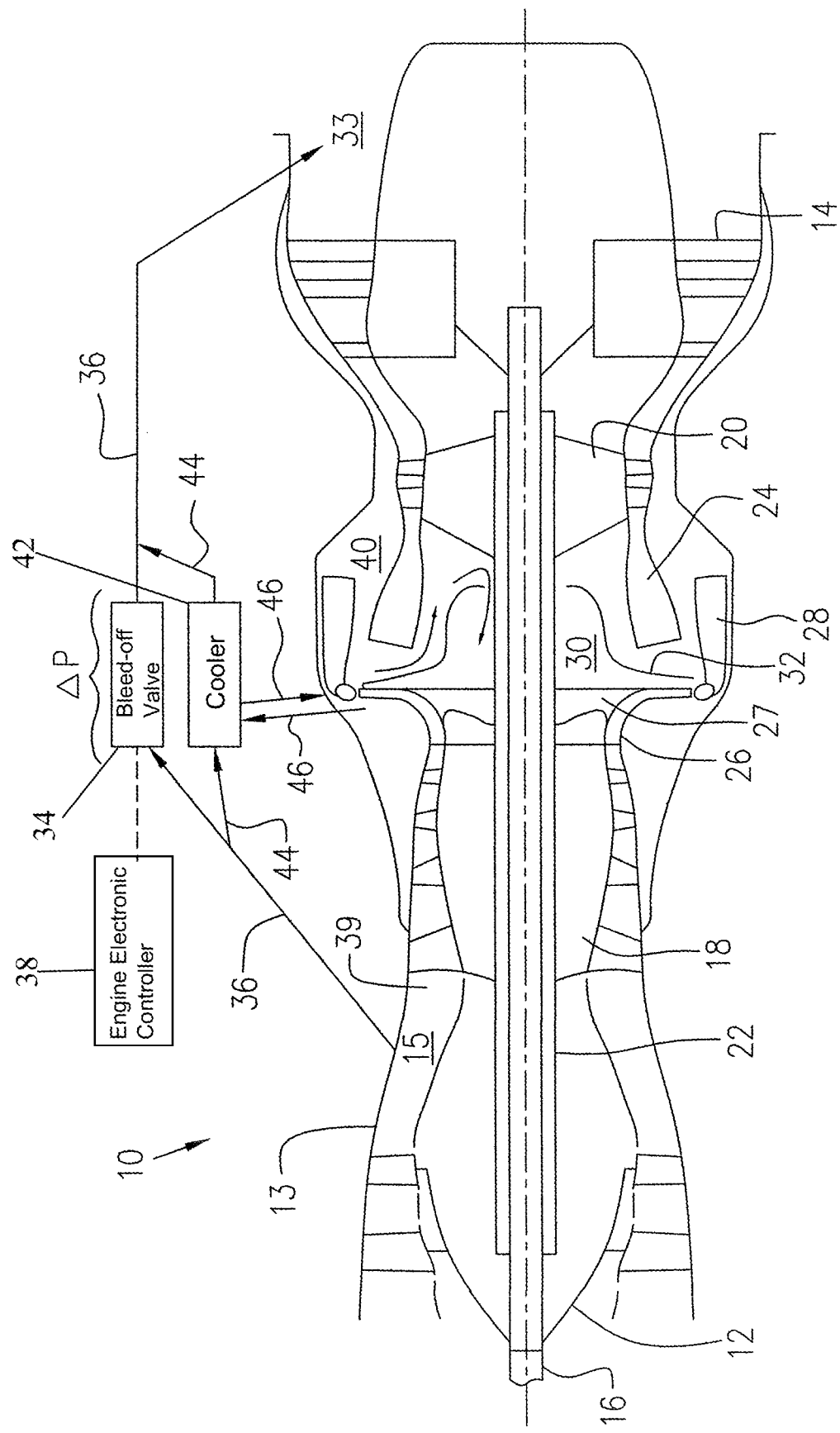

MODULATED COOLED P3 AIR FOR IMPELLER

TECHNICAL FIELD

The application relates generally to gas turbine engines, and more particularly to gas turbine engines having improved cooled air for impellers.

BACKGROUND OF THE ART

In gas turbine engine operation it is known to bleed off high pressure air, known as P3 air, from a diffuser of a compressor into an impeller rear cavity, downstream of the centrifugal impeller for the purpose of loading the impeller and thus removing stress on the adjacent bearings. However, such pressurized air is generally at a high temperature and tends to degrade the impeller hub, thereby reducing the effective lifespan of the impeller. In order to reduce the degradation effect on the impeller, it has been contemplated to use high heat resistant materials which, however, will increase the cost of the impeller while providing a weaker impeller hub more susceptible to fractionating under high centrifugal forces. Bypass air may be used to cool the P3 air entering the impeller rear cavity. However, this cooling method may present other issues and is even not applicable in gas turbine engines which do not produce bypass air such as turboprop or turboshaft engines.

Accordingly, an improved system and method for cooling an impeller of gas turbine engines is required.

SUMMARY

In one aspect, there is provided a gas turbine engine comprising a compressor section, including: a bleed-off valve apparatus connected in a bleed-air flow passage, for selectively bleeding low pressure compressor air from the compressor section through the bleed-air flow passage to an exhaust duct of the turbine section when the bleed-off valve apparatus is open; and a cooler having a first passage connected to the bleed-air flow passage in parallel with the bleed-off valve apparatus to allow a stream of said low pressure compressor air to flow through the cooler and to bypass the bleed-off valve apparatus when the bleed-off valve apparatus is closed, the cooler having a second passage for directing a stream of P3 air bled from the compressor section through the cooler for cooling the stream of P3 air before delivering the stream of P3 air to an impeller rear cavity of the compressor section.

In another aspect, there is provided a method of cooling a gas turbine engine compressor, the method comprising the steps of: (a) providing an apparatus for selectively opening and closing a bleed-off valve based on engine power levels, wherein closing the bleed-off valve creates a pressure differential in low pressure compressor air across the bleed-off valve apparatus when the engine is operated at high power levels, and opening the bleed-off value bleeds said low pressure compressor air to reduce said pressure differential when the engine is operated at low power levels; and (b) providing an apparatus for supplying said low pressure compressor air only during engine high power levels using said pressure differential to cool a stream of P3 bleed air before the stream of P3 bleed air enters into an impeller rear cavity of the compressor.

In a further aspect, there is provided a method of improving an impeller lifespan in a gas turbine engine, comprising reducing transition thermal gradients of an impeller of the gas turbine engine during engine operation between engine high power levels and engine low power levels, by providing a cooling system controllably supplying cooling air only during engine high power levels, in order to selectively cool a stream pf P3 air entering into an impeller rear cavity.

Further details of these and other aspects of the described subject matter will be apparent from the detailed description and drawings included below.

DESCRIPTION OF THE DRAWINGS

Reference is now made to the accompanying drawings in which:

FIG. 1 is a schematic and segmentary side cross-sectional view of an exemplary gas turbine engine showing an application of the described subject matter according to one embodiment.

DETAILED DESCRIPTION

FIG. 1 illustrates a segment of a gas turbine engine 10 such as a turboprop or turboshaft gas turbine engine which includes a casing 13, a low pressure spool assembly which includes a low pressure compressor assembly 12 (boost compressor) and a low pressure turbine assembly 14 connected by a first shaft 16, and a high pressure spool assembly which includes a high pressure compressor assembly 18 and a high pressure turbine assembly 20 connected by a second shaft 22. The casing 13 surrounds the low and high pressure spool assemblies in order to define a main fluid path 15 therethrough. In the main fluid path 15 there is provided a gas generator section (not numbered) including a combustion chamber 24 in which a combustion process produces combustion gases to power the high and low pressure turbine assemblies 20, 14, downstream of the combustion chamber 24.

The low and high pressure compressor assemblies 12, 18 form a compressor section (not numbered) of the gas turbine engine which may have multiple compressor stages and may include a centrifugal impeller 26 having an impeller hub 27 at downstream end of the compressor section. A pipe diffuser 28 may be provided to surround the centrifugal impeller 26, and the pipe diffuser 28 may extend downstream thereof within the casing 13. An impeller rear cavity 30 may be formed behind the impeller hub 27, and may be defined by a cavity wall 32.

The high and low pressure turbine assemblies 20, 14 form a turbine section (not numbered) of the gas turbine engine 10. The casing 13 may include a turbine exhaust duct 33 forming a downstream end of the turbine section to discharge gases exhausted from the low pressure turbine assembly 14. According to this embodiment, when multiple independently rotatable compressors, such as the low and high pressure compressor assemblies 12 and 18 are utilized to pressurize a working fluid in a common flow path (the main fluid path 15), it is desirable to bleed a portion of the working fluid from the common flow path 15. The bleeding of working fluid from the common flow path may be at conditions such as part power operation, in response to transit conditions and/or for prevention of a stall condition. A bleed-off valve (BOV) apparatus which is schematically illustrated by block 34 may be provided for selectively bleeding low pressure compressor air when the gas turbine engine 10 is operated at a low power level. For example, the bleed-off valve apparatus 34 may be connected in and may form part of a compressor bleed-air flow passage 36 which may include a long duct according to this embodiment, connected in fluid communication with the main fluid path 15 of the gas turbine engine 10 at a location of a boost exit 39 which is downstream of the low pressure compressor assembly 12 and upstream of the high pressure compressor assembly 18, and being connected at the other end in fluid communication with the turbine exhaust duct 33.

It should be noted that FIG. 1 shows a conceptual illustration of the bleed-off valve apparatus 34 and the compressor bleed-air flow passage 36 for selectively bleeding a stream of low pressure compressor air, such as P2.4 air from the boost exit 39 to be dumped into the turbine exhaust duct 33, but does not illustrate a physical configuration of the bleed-off valve apparatus and the compressor bleed-air flow passage 36. The bleed-off valve apparatus 34 may form part of the compressor bleed-air flow passage 36, the bleed-off valve apparatus 34 may be positioned in any possible location along the compressor bleed-air flow passage 36, such as being around the boost exit 39. The bleed-off valve apparatus is known in the industry and may have various physical configurations which will not be described herein.

The bleed-off valve apparatus 34 according to one embodiment may be modulated to be closed during the engine operation at an engine high power levels such that the bleeding stream of the low pressure compressor air such P2.4 bled from the boost exit 39 to flow through the compressor bleed-air flow passage 36 is discontinued, thereby creating a pressure of differential (indicated by ΔP) of the low pressure compressor air over the bleed-off valve apparatus 34.

The bleed-off valve apparatus 34 according to one embodiment may also be modulated to be open during engine operation at an engine low power levels to allow a bleeding stream of the low pressure compressor air such as P2.4 air bled from the boost exit 39 to flow through the bleed-off valve apparatus 34 and the compressor bleed-air flow passage 36, thereby significantly reducing the pressure differential ΔP over the bleed-off valve apparatus 34. Such modulation of the bleed-off valve apparatus 34 may be controlled by a controller illustrated by block 38 such as an engine electronic controller (EEC) of the gas turbine engine 10.

The impeller 26 is a highest pressure stage of the high pressure compressor assembly 18. Pressurized P3 air exits from tips (not numbered) of the centrifugal impeller 26 and flows through the pipe diffuser 28 into a plenum 40 around the combustion chamber 24, in order to enter into the combustion chamber 24 for the combustion process. A stream of P3 air bled from P3 plenum 40 may be directed into the impeller rear cavity 30 to provide air pressure against the rear wall of the impeller hub 27 to thereby adjust the thrust load on an adjacent bearing (not shown) which rotatably supports the second shaft 22 within the casing 13 of the gas turbine engine 10. During engine operation such as of a turbofan engine, the stream of P3 air may be continuously cooled by bypass air through a heat exchanger in order to reduce the high temperature of the P3 air before being directed into the impeller rear cavity 30, such as described in U.S. Pat. No. 6,035,627 which is incorporated by reference herein. However, for better impeller life, it is desirable to cool the stream of P3 air being directed into the impeller rear cavity 30 only during engine high power levels but not during engine low power levels. It should be noted that P3 air has a temperature higher than the temperature of compressor air in any lower pressure compressor stage. Therefore, a stream of low pressure compressor air such as P2.4 air may be used as a cooling fluid to cool P3 air.

An air cooling system according to one embodiment therefore is provided which includes the bleed-off valve apparatus 34 and a cooler illustrated by block 42 connected to the bleed-off valve apparatus 34 and the compressor bleed-air flow passage 36 for selectively cooling the stream of P3 air before the stream of P3 air is directed into the impeller rear cavity 30. The cooler 42 which is a heat exchanger, may have a first passage 44 extending therethrough and being connected with the compressor bleed-air flow passage 36 in a parallel relationship with the bleed-off valve apparatus 34. Therefore, the first passage 44 of the cooler 42 forms a bypass section in the compressor bleed-air flow passage 36 to allow a stream of the low pressure compressor air such as P2.4 air under the pressure differential ΔP to be bled for example, from the boost exit 39 to flow through the cooler 42 and entirely bypass the bleed-off valve apparatus 34, and then to be dumped into the turbine exhaust duct 33 through the compressor bleed-air flow passage 36 when the bleed-off valve apparatus 34 is modulated to be closed.

The cooler 42 may have a second passage 46 extending through the cooler 42 and being in fluid communication with the bled stream of P3 air and also with the impeller rear cavity 30 for continuously directing such a bled a stream of P3 air through the cooler 42 to enter into the impeller rear cavity 30. Therefore, the stream of P3 air to be directed into the impeller rear cavity 30 is cooled by the stream of low pressure compressor air such as P2.4 air flowing through the first passage 44 of the cooler 42, as a result of a heat exchange between the P2.4 air and P3 air flowing through the respective first and second passages 44, 46 of the cooler 42.

It should be noted that an air flow resistance of the bleed-off valve apparatus 34 when modulated to be open, is significantly smaller than an air flow resistance of the first passage 44 of the cooler 42. When the bleed-off valve apparatus 34 is modulated to be open, the stream of the low pressure compressor air such as P2.4 air bled from the boost exit 39 flows through the compressor bleed-air flow passage 36 and the bleed-off valve apparatus 34 and then into the turbine exhaust duct 33, resulting in a significant reduction of the pressure differential ΔP over the bleed-off valve apparatus 34. Due to the parallel connection of the bleed-off valve apparatus 34 and the cooler 42, this significantly reduced pressure differential ΔP is also applied over the cooler 42 (over the first passage 44 thereof). However, under such a significantly reduced pressure differential ΔP, there is no meaningful air flow passing through the first passage 44 of the cooler 42 due to the much higher air flow resistance of the first passage 44, resulting in no meaningful heat exchange taking place between the first and second passages 44 and 46 of the cooler 42. When the bleed-off valve apparatus 34 is modulated to be open, the cooler 42 effectively stops cooling the stream of P3 air flowing through the second passage 46.

Therefore, the cooling system according to one embodiment provides the low pressure compressor air as the modulated cooling air supply which is controlled by the modulated bleed-off valve apparatus 34 to selectively cool the stream of bled P3 air to be directed into the impeller rear cavity 30, in order to cool the impeller 26 only when the engine is operated at high power levels. The cooling system automatically shuts down the cooling operation when the engine is operated at low power levels, also being controlled by the modulated bleed-off valve apparatus 34. Therefore, the impeller rear cavity temperature difference between engine high power levels and engine low power levels will be significantly reduced (compared to the conventional cooling method), which will significantly improve impeller lifespan because this reduces the transit thermal stress of the impeller. The first passage 44 of the cooler 42 may require very short pipe connections to the bleed-off valve apparatus 34 which removes the need for a dedicated long coolant duct as in conventional P3 coolers, which results in significant savings in weight and costs.

It should be noted the bled stream of P3 air which is selectively cooled or not cooled, is continuously directed through the second passage 46 of the cooler 42 into the impeller rear cavity 30 during engine operation.

The above description is meant to be exemplary only, and one skilled in the art will recognize that changes may be made to the embodiments described without departing from the scope of the described subject matter. For example, the turboprop or turboshaft gas turbine engine is described as an example of the application of the described subject matter. Nevertheless, other types of gas turbine engines such as turbofan engines may also be applicable for the described subject matter. Furthermore, various types of bleed-off valve apparatuses and coolers which may be known or unknown, may be suitable for use in the cooling system of the described subject matter. Modifications which fall within the scope of the described subject matter will be apparent to those skilled in the art, in light of a review of this disclosure, and such modifications are intended to fall within the appended claims.

The invention claimed is:

1. A gas turbine engine comprising a compressor section, including:
   a bleed-off valve connected in a bleed-air flow passage, for selectively bleeding low pressure air from the compressor section through the bleed-air flow passage to an outlet of an exhaust duct when the bleed-off valve is open, the outlet disposed downstream of a turbine section;
   a cooler having a first passage connected to the bleed-air flow passage in parallel with the bleed-off valve to allow a stream of said low pressure air to flow through the cooler and to bypass the bleed-off valve when the bleed-off valve is closed, the cooler having a second passage for directing a stream of high pressure air bled from a plenum around a combustion chamber through the cooler before delivering the stream of said high pressure air to an impeller rear cavity formed behind an impeller hub of the compressor section, the stream of said high pressure air having a higher pressure than the stream of said low pressure air;
   wherein the stream of said low pressure air through the first passage of the cooler is modulated by the bleed-off valve parallel to the first passage of the cooler, so as to selectively cool the stream of said high pressure air flowing through the second passage of the cooler with the stream of said low pressure air; and
   a controller configured to control the bleed-off valve such that the bleed-off valve is closed during engine high power and is open during engine low power.

2. The gas turbine engine as defined in claim 1 wherein the compressor section comprises a low pressure compressor, and a high pressure compressor including an impeller and defining the impeller rear cavity.

3. The gas turbine engine as defined in claim 2 wherein the bleed-air flow passage is connected to a main fluid path of the gas turbine engine at a location downstream of the low pressure compressor and upstream of the high pressure compressor.

4. The gas turbine engine as defined in claim 1 wherein the bleed-off valve forms part of the bleed-air flow passage and has a first air flow resistance lower than a second air flow resistance of the first passage of the cooler.

5. A method of cooling an impeller of a compressor of a gas turbine engine, the method comprising:
   bleeding low pressure air from the compressor of the gas turbine engine through a bleed-air flow passage, the bleed-air flow passage in fluid communication with a first passage of a cooler;
   bleeding a stream of high pressure air from a plenum around a combustion chamber, the stream of said high pressure air having a greater pressure than the low pressure air;
   continuously circulating the stream of said high pressure air through a second passage of the cooler to a cavity adjacent a hub of the impeller; and
   modulating a cooling of the stream of said high pressure air in the cooler by modulating a flow of the low pressure air bypassing the first passage of the cooler while flowing through the bleed-air flow passage to exit the bleed-air flow passage downstream of a turbine section of the gas turbine engine, wherein modulating the flow of the low pressure air bypassing the first passage of the cooler while flowing through the bleed-air flow passage includes selectively opening and closing a bleed-off valve of the bleed-air flow passage, the bleed-off valve being connected to the bleed-air flow passage in parallel with the first passage of the cooler, including closing the bleed-off valve during engine high power levels and opening the bleed-off valve during engine low power levels.

6. The method as defined in claim 5, wherein closing the bleed-off valve creates a pressure differential in the low pressure air across the bleed-off valve when the gas turbine engine is operated at the high power levels, and opening the bleed-off valve bleeds the low pressure air to reduce the pressure differential when the gas turbine engine is operated at the low power levels.

7. The method as defined in claim 5, comprising reducing transition thermal gradients of the impeller of the gas turbine engine during engine operation between the engine high power levels and the engine low power levels by modulating the flow of the low pressure air bypassing the first passage to supply the low pressure air in the first passage only during said engine high power levels.

8. The method as defined in claim 7 wherein modulating the flow of the low pressure air bypassing the first passage is achieved via modulating the bleed-off valve.

9. The method as defined in claim 7 wherein modulating the flow of the low pressure air bypassing the first passage is achieved by connecting the cooler to the bleed-off valve modulated to be closed during said engine high power levels to create a pressure differential of the low pressure air over the bleed-off valve, and modulated to be open to allow the low pressure air to bypass the cooler during said engine low power levels, thereby reducing said pressure differential.

10. The method as claimed in claim 9 wherein the cooler and the bleed-off valve are connected in a parallel relationship, one with the other, to thereby supply the low pressure air under said pressure differential to the cooler as a cooling work fluid to cool the stream of said high pressure air before entering into the cavity of the impeller only during the engine high power levels.

* * * * *